United States Patent [19]

Watanabe et al.

[11] 4,317,270

[45] Mar. 2, 1982

[54] METHOD OF MAKING AN ELASTIC ROLLER

[75] Inventors: Tsuyoshi Watanabe, Kawasaki; Hidetoshi Murase; Akira Murayama, both of Yokohama; Mikio Nakasugi, Tokyo, all of Japan

[73] Assignee: Canon Kabushiki Kaisha, Tokyo, Japan

[21] Appl. No.: 231,111

[22] Filed: Feb. 3, 1981

Related U.S. Application Data

[62] Division of Ser. No. 55,559, Jul. 9, 1979, Pat. No. 4,268,943.

[30] Foreign Application Priority Data

Jul. 26, 1978 [JP] Japan .................................. 53/91046

[51] Int. Cl.[3] ............................................. B29C 27/20

[52] U.S. Cl. ........................................ 29/447; 29/131; 29/148.4 D; 29/448; 156/86; 264/230; 264/342 R

[58] Field of Search .................... 156/86; 29/131, 132, 29/148.4 D, 422, 447, 448; 264/230, 342 R; 118/651

[56] References Cited

U.S. PATENT DOCUMENTS

| | | | |
|---|---|---|---|
| 3,434,193 | 3/1969 | Meyer | 29/447 |
| 3,588,264 | 6/1971 | Mallindine | 15/230.11 |
| 3,710,470 | 1/1973 | Krake | 29/131 |
| 3,941,635 | 3/1976 | Tavelle et al. | 156/86 |
| 4,098,631 | 7/1978 | Anthony | 264/342 R |

*Primary Examiner*—Caleb Weston

*Attorney, Agent, or Firm*—Fitzpatrick, Cella, Harper & Scinto

[57] ABSTRACT

An elastic roller composed of an axial core member and an elastic, liquid retentive layer of foam structure with uniform layer thickness surrounding the circumference of said core member, said elastic roller further comprising a flexible, liquid permeable member in the form of a cylinder or sleeve having an inner diameter smaller than the outer diameter of said roller, said flexible member being disposed to cover the circumference of said roller and having extensions extending beyond both side ends of said roller and being shrunk along the ends of said elastic foam structure layer at both sides, respectively, so as to cover also said side ends of the layer with said flexible member. A method of making the elastic roller is also disclosed.

8 Claims, 7 Drawing Figures

METHOD OF MAKING AN ELASTIC ROLLER

This is a division of application Ser. No. 55,559, filed July 9, 1979, now U.S. Pat. No. 4,268,943.

BACKGROUND OF THE INVENTION

1. Field of the Invention

The present invention relates to an elastic roller adapted for image forming apparatus such as electrophotographic copying apparatus and particularly suitable for use in the liquid developing part or the liquid cleaning part in an image forming process.

More particularly, the present invention is directed to improvements in such elastic roller and also to a method of making the improved elastic roller.

In image forming apparatus, for example, in an electrophotographic copying machine of the type in which liquid developer is used, there are conventionally provided elastic rollers for such stations of developing, liquid squeezing, cleaning etc. As one of the elastic rollers developed for this purpose, Japanese Patent Application Laid Open No. 55644/1977 has already disclosed such type of elastic roller in which the spongy layer retentive of liquid is covered by an additional flexible member of liquid permeability, such as a mesh or network member. When such elastic roller is rotated while in contact with a surface of a rigid member, such as a photosensitive member or an insulating member, a desired nip can be provided therebetween and liquid can be squeezed out from the liquid retentive layer of the roller or absorbed into the layer depending upon the elastic deformation of the roller. It is acknowledged in the art that such type of elastic rollers can be used advantageously in the developing station, liquid squeezing part and cleaning station of an electrophotographic copying apparatus.

2. Description of the Prior Art

While the above mentioned type of elastic roller according to the prior art as disclosed in Japanese Patent Application Laid Open No. 55644/1977 has various advantages, it involves a problem in assembling and manufacturing thereof.

As described above, the known elastic roller comprises an additional outer layer of network such as wire net provided on the circumference of the inner liquid retentive spongy layer of the roller. In assembling the outer network layer on the inner spongy layer there arises a difficulty in establishing a close and uniform contact between the outer and inner layers without any irregularity of covering. This is attainable only by employing an extremely high standard of technique. In particular, when such elastic roller is to be incorporated into an electrophotographic copying machine, it is essential to lay the outer layer on the inner layer uniformly and tightly. Otherwise, crease may be formed on the outer circumferential surface of the roller. In fact, hitherto, problems have been often observed in the copying machine such that during operation and when the roller is brought into contact with the surface of a rigid member, the elastic roller gets creased at its outer layer, that is, in the network. Also, it has been found that the development of creases in the elastic roller during operation is most remarkable at the end portions of the roller.

Treatment of end portions of the outer layer network at both edges of the roller is also very important for performance and durability of the roller. If the end portions of the network remain exposed at both edges of the elastic roller, then the network gradually frays, starting from the end portions during operation. When fraying occurs, the elastic roller no longer functions properly and causes irregularity along the length of the roller in the liquid squeezing and absorbing action.

The above mentioned problems of creasing on the roller surface and irregularity of roller action along the length of the elastic roller may be partly attributable to the difference in flexibility or hardness between the outer and inner layers. In any case, use of the elastic roller having such defects will create various problems in making copies. When such elastic roller is used in the developing step, irregularity of developing performance may be caused by creases formed on the roller surface and by the irregularity of the liquid squeezing and absorbing action along the roller length. If the roller is used to remove any excess of liquid developer, irregularity of squeezed developer may also be caused. When used as a cleaning roller, no uniform cleaning can be expected with such elastic roller and in the next step of electric charging also irregularity of charge may be caused thereby.

In addition to the above problems, the known elastic roller has another important problem. During long use of the roller the end portions of the roller become tapered towards the outside and liquid developer unnecessarily flows along the tapered end portions to the surface of a member with which the roller is an contact under pressure, for example, to the surface of the photosensitive drum. This unfavorable flow of liquid developer onto the drum surface along the tapered end portions of the elastic roller gives a soiled look to the visualized or developed images and in the extreme it also soils the transfer sheets.

Until now, there has not been a proposal of any effective solution to the above mentioned problems involved in the known elastic roller.

SUMMARY OF THE INVENTION

Accordingly, it is the primary object of the present invention to eliminate the above described problems involved in known elastic rollers adapted for image forming apparatus such as an electrophotographic copying machine.

It is a still more specific object of the present invention to provide an elastic roller which has better performance and broader versatility of application while eliminating the above mentioned problems involved in known elastic rollers and also to provide a method of making such improved elastic roller.

Another object of the invention is to provide an elastic roller which allows it to maintain uniform and constant contact pressure at the nip area all over the length of the roller including both end portions thereof, and which allows the liquid to adequately perform the absorption and squeezing process through the contact surface while maintaining the flexibility of at least the surface layer of the roller.

A further object of the invention is to provide a novel method of making such improved elastic roller enabling to assemble the components into an elastic roller with higher accuracy and reliability.

A still further object of the invention is to provide an elastic roller which does not form and develop creases in its surface layer even when there is some difference in peripheral speed or in the direction of rotation between the elastic roller and the rigid partner member or even when there is some irregularity in contact pressure between the two members.

It is also an object of the present invention to provide an elastic roller which is easy to assemble and simple in structure and which is excellent in its function and performance.

According to an aspect of the present invention, there is provided an elastic roller composed of an axial core member and an elastic, liquid retentive layer of foam structure with uniform layer thickness surrounding the circumference of said core member, said elastic roller further comprising a flexible, liquid permeable member in the form of a cylinder or sleeve having an inner diameter smaller than the outer diameter of said roller, said flexible member being disposed to cover the circumference of said roller and having extensions extending beyond both side ends of said roller and being shrunk along the ends of said elastic foam structure layer at both sides respectively so as to cover also said both side ends of the layer with said flexible member.

According to another aspect of the present invention, there is provided a method of making an elastic roller comprising the steps of forming a roller body by overlaying an axial core member with an elastic, liquid retentive layer of foam structure having substantially uniform thickness surrounding the circumference of said core member; inserting the formed roller body into a sleeve of liquid permeable, flexible member having a total length larger than axial length of said roller body and having an inner diameter smaller than the outer diameter of said roller body; shrinking said sleeve at its portions extending beyond both side ends of the inserted roller body along both ends of said roller body while heating said portions; and holding back the free ends of said shrunken sleeve and inserting it into a hollow room of said core member while securing said free ends onto the wall of said core member by pressure.

Other and further objects, features and advantages of the invention will appear more fully from the following description taken in connection with the accompanying drawings.

DESCRIPTION OF THE PREFERRED EMBODIMENTS

Figure 1:
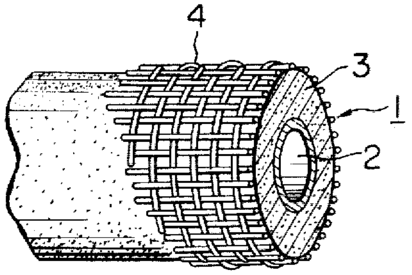
FIGS. 1 and 2 are illustrative views of components for an elastic roller pertinent to the present invention.
Figure 2:
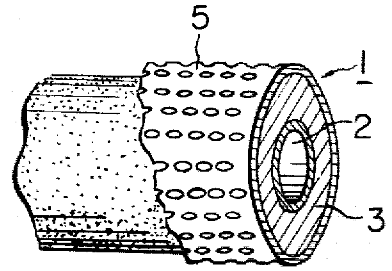

Referring first to FIGS. 1 and 2, essential members constituting an elastic roller according to the invention will be described in detail for a better understanding of the invention.

The elastic roller to which the present invention relates comprises three essential members, that is, a core member serving as a support, a porous and elastic member surrounding the core member and a flexible member having a plurality of opening through the member, said flexible member being laid on the elastic member to form the outermost layer of the elastic roller.

In FIG. 1, the core member is designated by 2, the elastic member by 3 and the flexible member by 4. These three members constitute an elastic roller 1. The core member 2 serving as a support is made from rigid material such as metal or hard synthetic resin. The elastic member 3 is a foam structure, such as polyurethane foam. The flexible member 4 covering the elastic member 3 is a network. The elastic member of foam structure 3 is mounted fixedly on the core member 2 and the flexible network member 4 is secured to the elastic member 3 by means of restoring force from elastic deformation of the elastic foam member 3 so that the members 3 and 4 may be rotated together with the axial core member 2.

Since the elastic foam member 3 has a plurality of pores or open cells which are in communication with each other and elastically deformable, the elastic member is able to absorb and squeeze out liquid, depending on its own elastic deformation. The flexible network member 4 may be of natural fiber or synthetic fiber. The network member allows liquid to flow in and out from the foam structure member 3 through the openings of the network 3. Thus, when the elastic roller impregnated with liquid is compressed, the liquid is squeezed out from the foam member 3 to the outside of the roller 1 through the network 4. When compression force is released from the roller and the foam structure member 3 is restored to its original state, liquid present in the vicinity of the surface of the network 4 is absorbed into the foam member 3 through the openings of the network.

The mesh of the outmost network member 4 shown in FIG. 1 may vary widely. For the elastic roller 1 used as a developing roller in an electrophotographic copying apparatus, the mesh is preferably in a range from 100 to 300. Considering various factors such as liquid retention, mechanical strength and chemical stability against liquid developer, it is preferable to use, as the network 4, those fabrics made by weaving monofilament yarn of polyamide, polyester, polypropylene, polyether, polyvinyl chloride, polyacrylonitrile and polyvinyl alcohol. While the network structure of plain weave is particularly preferable, other network structures such as that of twilled fabric or fabric in satin weave is also useful. Those structures as obtained by deforming the above networks by pressure may also be used. When the network member 4 is laid on the foam structure member 3, it is advisable that the weft of the network is disposed in parallel with the rotation axis of the elastic roller 1 as shown in FIG. 1.

Within the scope of the present invention, the structure of the elastic roller can be variably modified. For example, the flexible, liquid permeable member which constitutes the outermost circumference of the elastic roller according to the present invention is not limited only to a network as shown in FIG. 1. The requirements which the flexible member must satisfy are only to have openings through which a sufficient communication can be assured between the inside and outside of the elastic roller; to have flexibility in a direction normal to the surface which is contacted by the surface of another rigid member and to allow no possibility of the openings in the contact surface area being closed by contact between the two members.

FIG. 2 shows another form of the flexible member useful for the invention.

In FIG. 2, the flexible member designated by 5 is a sleeve of resin film having a plurality of openings provided therein. While the openings in the sleeve 5 are shown to be circular, they may be in rectangular, elliptical or mosaic form of combinations thereof.

The elastic member of foam structure 3 does not necessarily have to be in a single layer as shown in FIGS. 1 and 2. The elastic member 3 may be formed in multi-layers. It may be formed using any suitable material which has number of communicated cells retentive of liquid therein and has a sufficient elasticity to absorb and squeeze out liquid owing to its own elastic deformation. Examples of suitable material for the elastic member 3 include foam structures of polystyrene, polyethylene, NBR (nitrile rubber), SBR, polyurethane, polyvinyl chloride and elastic members formed by natural, synthetic or metal fibers.

The axial core member 2 serves as a support for the elastic member 3 and is usually made of metal or alloy, such as stainless steel and aluminum or rigid plastics such as polyoxymethylene and polyamide.

Figure 3:
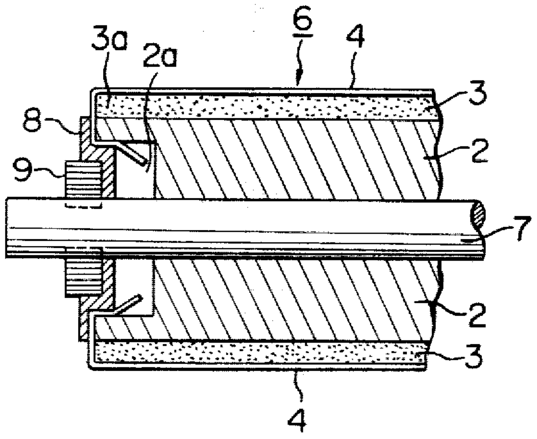
FIG. 3 is a schematic, sectional view of an embodiment of the present invention showing only one end portion of the elastic roller.

Now, improvements made in the above described type of elastic roller according to the present invention are described in detail and refer to FIG. 3.

The essential feature of the present invention is found in the structure of end portions of the elastic roller. While in FIG. 3 only one end portion of the elastic roller is shown, it should be understood that the other end portion of the roller has the same structure as shown in FIG. 3. The same reference numerals as used in FIG. 1 designate members having the same functions as in FIG. 1.

The elastic roller shown in FIG. 3 comprises a core member 2 serving as a support, an elastic foam structure member 3 with uniform thickness surrounding the core member and a network member 4 disposed on the outer circumferential surface of the elastic member.

The network member 4 has an extension extending beyond the end 3a of the elastic member 3. The extension is shrunk first along the side end surface including the ends of the core member 2 and the elastic member 3 so as to tightly enclose the side end surface. Then the free end portion of the extension is folded back into a hollow room 2a provided between the core member 2 and the rotating shaft 7 of the roller.

No adhesive is applied to the contact area between the network member 4 and the member adjacent thereto, such as the elastic foam layer 3 or the core member 2. The network member 4 is fastened to the end wall of the core member 2 only at the free end portions of the network member. To this end, a securing ring 8 and a fastening member 9 are used at each end of the roller. A molded ring of hard plastic material such as polyacetal having an adequate resiliency may be used for the securing ring 8. The ring 8 and fastening member 9 may be bonded together into a one piece member with adhesive or heat.

By selecting optimum conditions for fastening the network member 4, taking into consideration the resiliency or hardness of the ring 8, flatness of the core member's end surface and friction between the ring 8 and core member 2, such problems such as the network member 4 being loosened or worn off at its end portions, can be eliminated or minimized according to the invention.

As previously mentioned, the network member 4 shown in FIG. 3 is only one example of various forms useful as a flexible, liquid permeable member serving as a top layer of the elastic roller according to the present invention. It should be understood that the present invention is not limited to this example only.

The manner of assembly for making the above elastic roller according to the present invention, in particular, the manner of processing the end portions of the roller, is described hereinafter with reference to FIGS. 4 through 7 in which only one end portion of the elastic roller 6 is shown for the sake of simplification.

At the assembly stage shown in FIG. 4, a body of elastic roller comprising the core member 2 and the elastic member 3 with uniform thickness surrounding the core member is inserted into a seamless network member 4 in a form of cylinder which is hereinafter referred to also as network sleeve 4. The inner diameter of the network sleeve 4 is somewhat smaller than the outer diameter of the roller body, whereas the length of the sleeve 4 is larger than that of the core member 2. When the roller body is inserted into the network sleeve 4, the elastic foam structure 3 is slightly compressed because of its smaller outer diameter. After insertion, the network sleeve 4 extends beyond the end of the elastic member 3 by a length of the extension 4a at both end sides of the roller body (one side only is seen in the drawing) because the sleeve is longer than the axial length of the roller body.

Figure 4:
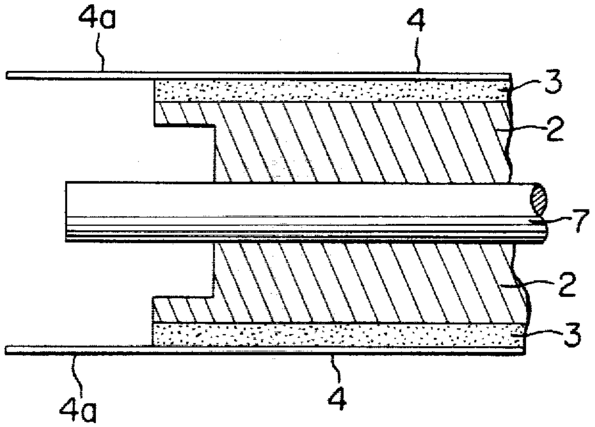
FIGS. 4 through 7 illustrate the assembly steps for making an elastic roller according to the present invention showing only one end portion thereof in schematic sectional view.
Figure 5:
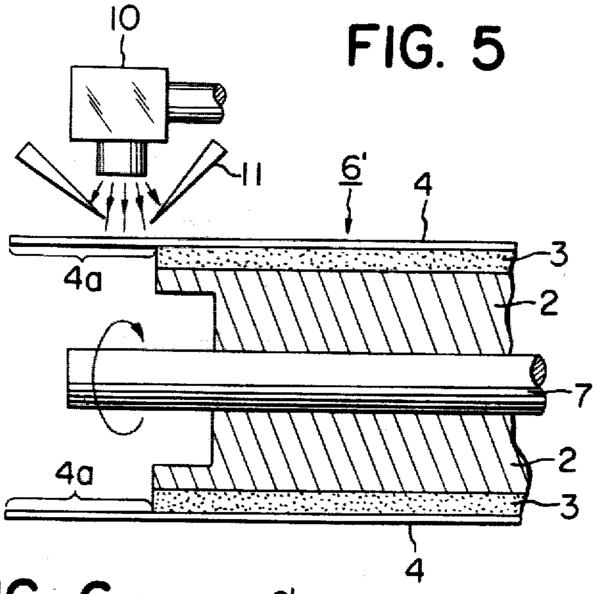
Figure 6:
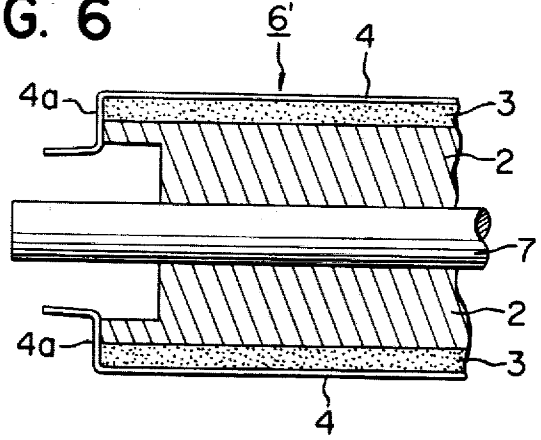

The semi-finished roller assembled at the step shown in FIG. 4 which is referred to as a semi-finished roller 6', is then brought to the next processing step shown in FIG. 5. At this step of FIG. 5, the extension 4a of the network member 4 is exclusively heated up to a temperature below the melting point of the network member 4 so that a heat shrinkage of the extension may take place. More particularly, hot air is blown to the area to be heated through a slit 11 employing suitable hot air blowing means such as a dryer 10. At the time of blowing, the position of slit 11 has to be carefully selected to prevent hot air from blowing against the body of the semi-finished roller 6'. Otherwise, the elastic foam structure member 3 and/or the main part of the network member 4 other than the extension 4a may be deformed by heat. To assure uniform application of heat to the network sleeve along its circumference and also to make the processing easier, the semi-finished roller 6' is rotated about its axis 7 during hot air blowing as indicated by the arrow in FIG. 5. In this step, the network sleeve 4 is shrunk along the side end surface of the roller 6' and brought into close and tight contact with the elastic foam structure 3 without any deformation of the end portion of the latter as seen in FIG. 6.

If desired, a special processing aid material may be applied to the network to be heated prior to the above heat shrinking treatment. For example, the heat treatment can be carried out advantageously in combination with such processing aid material which has the effect of preventing the shrunken network to expand again to its original state.

Our experiments have proved that the network sleeve 4 once subjected to the above heat shrinking treatment will not suffer thereafter from unfavourable deformation, such as creasing and bulging.

In one experiment, there was used, as the member 4, a plain weave network of 200 mesh made of polyester fiber. In the manner shown in FIG. 5, hot air at a temperature ranging from 250° C. to 400° C. was blown against the network for about 5 to 30 seconds. Good shrinkage was obtained without any development of crease. A shrinkage in the range of 5–7 mm in outer diameter was accomplished by this treatment.

In another experiment, a plain weave network of 180 mesh made of polyvinyl alcohol fiber was used as the member 4. Hot air at a temperature ranging from 200° C. to 300° C. was blown against the network for 5 to 20 seconds. This treatment resulted in nearly the same shrinkage as in the above treatment.

Figure 7:
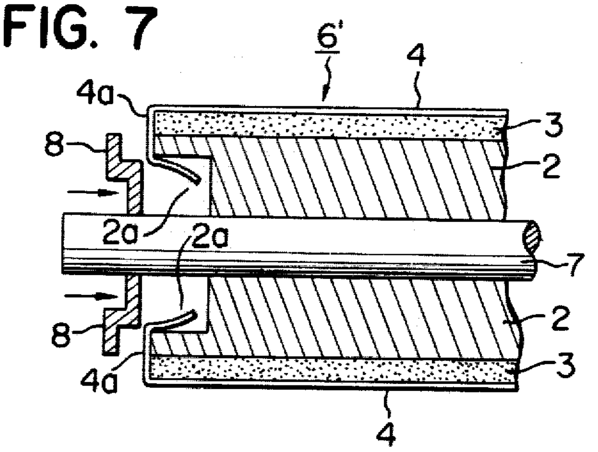

After the above heat shrinking treatment, the free end portion of the extension 4*a* of the network sleeve 4 is folded back into the space 2*a* provided between the rotary shaft 7 and the core member 2, as shown in FIG. 7. After folding, a securing ring 8 is pushed into the space along the shaft 7 to press the free end against the end of the roller 6'. Thus, the free end is fixed to the end of the roller and assembly is completed.

The elastic roller assembled in this manner according to the invention has the following advantages over prior art:

1. The free ends of the network member is not exposed to the exterior at both side ends of the elastic roller and uniformity in performance of the roller can be assured over the whole circumference of the roller.

2. Since the end portions of the network member is uniformly shrunk and secured to the end of the roller, keeping a close contact between the end of the network member and the end surface of the roller body, no problem of unfavorable deformation of the network occurs, such as creasing, bulging or twisting.

3. The number of parts required for end treatment of the network is very few and the assembly and manufacture of the elastic roller can be carried out in a simple manner.

4. The number of parts projecting beyond the ends of the roller is very few and, therefore, the end portions of the roller retain no liquid during rotation, which in turn eliminates problems such as soiling of the image marginal portions by such unnecessary liquid during development.

5. The problem of tapering of the roller ends is solved and, therefore, no flow of liquid, such as liquid developer forms along the otherwise tapered ends of the roller. This has the effect of eliminating the problem of the transfer sheet or other member being unduly soiled.

6. The elastic roller has an active surface extending along the full length of the roller, including its both end portions. Therefore, the design of an elastic roller with the necessary minimum length is made possible. This makes it possible to further miniaturize apparatus in which the elastic roller is to be incorporated.

7. The free ends of the network member and the underlying elastic foam structure member are not left exposed to the exterior at both side ends of the roller. Therefore, these end portions are protected against damage caused by contact with a rigid member, i.e., the net is not frayed. This will ensure a longer life for the roller.

The above mentioned effects 1-7 can be given only to those rollers which are manufactured according to the above manufacturing and assembling process. For other elastic rollers to which the present invention was not employed there arise various problems. In particular, the network member has a tendency to become separated from the roller body, which results in many problems as previously mentioned.

While not shown concretely in the embodiments, the elastic roller according to the present invention has many applications other than that of developing means. It may be used, for example, as a liquid squeezing means, a liquid flow choking means and cleaning means in image forming apparatus working with liquid. For any application, the elastic roller according to the invention can work effectively with many advantages mentioned above which the known elastic rollers according to the prior art did not have.

While the invention has been particularly shown and described with reference to the preferred embodiments thereof, it will be understood by those skilled in the art that the foregoing and other changes in form and details can be made therein without departing from the spirit and scope of the invention.

What we claim is:

1. A method of making an elastic roller comprising the steps of forming a roller body by overlaying an axial core member with an elastic, liquid retentive layer of foam structure having uniform thickness surrounding the circumference of said core member; inserting the formed roller body into a sleeve of liquid permeable, flexible member having a total length larger than axial length of said roller body and having an inner diameter smaller than the outer diameter of said roller body; shrinking said sleeve at its portions extending beyond the both side ends of the inserted roller body along the both ends of said roller body while heating said portions; and folding back the free ends of said shrunk sleeve into a hollow room of said core member and securing said free ends onto the wall of said core member by pressure.

2. A method of making an elastic roller according to claim 1, wherein said heating is carried out at a temperature below the melting point of said flexible member.

3. A method of making an elastic roller according to claim 1, wherein said heating is carried out by blowing hot air to the circumference of said sleeve.

4. A method of making an elastic roller according to claim 1, wherein said heating is carried out while limiting the area to be heated.

5. A method of making an elastic roller according to claim 1, wherein said flexible member is a network of synthetic fiber in plain weave.

6. A method of making an elastic roller according to claim 1, wherein said flexible member is of heat shrinkable material.

7. A method of making an elastic roller according to claim 1, wherein said flexible member is formed as a molded seamless network sleeve.

8. A method of making an elastic roller according to claim 1, wherein said sleeve member and elastic foam structure layer remain unbonded to each other at the interface between the two members.

* * * * *